US012489229B2

(12) United States Patent
Lee

(10) Patent No.: US 12,489,229 B2
(45) Date of Patent: Dec. 2, 2025

(54) TERMINAL BLOCK HAVING LEAKAGE CURRENT RESTRICTING FUNCTION

(71) Applicant: VISION TECH Corporation, Busan (KR)

(72) Inventor: Ho Seok Lee, Busan (KR)

(73) Assignee: VISION TECH Corporation, Busan (KR)

( * ) Notice: Subject to any disclaimer, the term of this patent is extended or adjusted under 35 U.S.C. 154(b) by 433 days.

(21) Appl. No.: 18/020,678

(22) PCT Filed: Oct. 28, 2020

(86) PCT No.: PCT/KR2020/014757
§ 371 (c)(1),
(2) Date: Feb. 10, 2023

(87) PCT Pub. No.: WO2021/261673
PCT Pub. Date: Dec. 30, 2021

(65) Prior Publication Data

US 2023/0299513 A1 Sep. 21, 2023

(30) Foreign Application Priority Data

Jun. 26, 2020 (KR) ........................ 10-2020-0078494

(51) Int. Cl.
*H01R 9/24* (2006.01)

(52) U.S. Cl.
CPC ...................................... *H01R 9/24* (2013.01)

(58) Field of Classification Search
None
See application file for complete search history.

(56) References Cited

U.S. PATENT DOCUMENTS 6,814,628 B2 * 11/2004 Chadbourne ........ H01R 9/2408 439/717
2023/0299513 A1 9/2023 Lee

FOREIGN PATENT DOCUMENTS

| | | | |
|---|---|---|---|
| JP | 06-084556 | A | 3/1994 |
| KR | 20-0457897 | | 1/2012 |
| KR | 10-1434600 | B1 | 8/2014 |
| KR | 10-1625493 | B | 5/2016 |
| KR | 10-1984479 | B | 5/2019 |
| KR | 10-2019-0098085 | A | 8/2019 |
| KR | 10-2434708 | B1 | 8/2022 |

OTHER PUBLICATIONS

International Search Report mailed Mar. 23, 2021 for International Application No. PCT/KR2020/014757 and its English translation.
Vietnamese Office Action mailed Apr. 24, 2024 from the Vietnamese Patent Office for Vietnamese Application No. 1-2022-08461 and its English translation.

* cited by examiner

*Primary Examiner* — Ross N Gushi
(74) *Attorney, Agent, or Firm* — Insight Law Group, PLLC; Seung Lee

(57) ABSTRACT

The present invention relates to a terminal block having a leakage current restricting function, in which leakage current is restricted by using differences in the areas of conductive electrodes connecting the ends of a single-phase three line input side phase voltage line (R line), neutral line (N line) and ground line (G) with the output side phase voltage line (R line), neutral line (N line) and ground line (G), respectively, and thus electric shock accidents can be more effectively prevented.

1 Claim, 2 Drawing Sheets

TERMINAL BLOCK HAVING LEAKAGE CURRENT RESTRICTING FUNCTION

CROSS-REFERENCE TO RELATED APPLICATIONS

This application is a 371 national phase entry of International Application No. PCT/KR2020/014757, filed on Oct. 28, 2020, which claims the benefit of and priority to Korean Patent Application No. 10-2020-0078494, filed Jun. 26, 2020, the disclosures of which are herein incorporated by reference in their entirety.

TECHNICAL FIELD

The present invention relates to a technique for restricting a leakage current, and more particularly, to a terminal block having a leakage current restricting function.

BACKGROUND ART

Korean Patent Registration No. 10-1625493 (May 24, 2016) previously filed by the applicant of the present invention discloses a technique in which a leakage current decreases as an area difference between two plate-shaped conductors increases. In the technique, electric shock is prevented by restricting a leakage current using an area difference between conductor electrodes.

Therefore, the inventors of the present invention have researched a terminal block having a leakage current restricting function in which a leakage current is restricted using an area difference between conductor electrodes of which both ends are connected to each of a phase voltage line (R line), a neutral line (N line), and a ground line (G line) at an input side of a single-phase three-line and each of a phase voltage line (R line), a neutral line (N line), and a ground line (G line) at output side thereof, thereby preventing a risk of electric shock.

DISCLOSURE

Technical Problem

The present invention is directed to providing a terminal block having a leakage current restricting function in which a leakage current is restricted using an area difference between conductor electrodes of which both ends are connected to each of a phase voltage line (R line), a neutral line (N line), and a ground line (G line) at an input side of a single-phase three-line and each of a phase voltage line (R line), a neutral line (N line), and a ground line (G line) at an output side thereof, thereby preventing a risk of electric shock.

Technical Solution

According to an embodiment of the present invention, a terminal block having a leakage current restricting function includes an insulator terminal block body including an R conductor electrode, an N conductor electrode, and a G conductor electrode which are mounted therein, wherein a phase voltage line (R line) at an input side of a single-phase three-line and a phase voltage line (R line) at an output side of the single-phase three-line are connected to both end portions of the R conductor electrode, a neutral line (N line) at the input side of the single-phase three-line and a neutral line (N line) at the output side of the single-phase three-line are connected to both end portions of the N conductor electrode, and a ground line (G line) at the input side of the single-phase three-line and a ground line (G line) at the output side of the single-phase three-line are connected to both end portions of the G conductor electrode, an insulator outer case coupled to the insulator terminal block body to surround an upper portion and a lower portion thereof, and a leakage current restricting unit which is in electrical contact with the N conductor electrode of the insulator terminal block body and expands an area of the N conductor electrode to restrict a leakage current.

The leakage current restricting unit may include a conductor area expansion piece which is in electrical contact with the N conductor electrode and expands the area of the N conductor electrode.

The leakage current restricting unit may further include a conductor inner case which is electrical contact with the conductor area expansion piece and additionally expands the area of the N conductor electrode.

Advantageous Effects

In the present invention, a leakage current is restricted using an area difference between conductor electrodes of which both ends are connected to each of a phase voltage line (R line), a neutral line (N line), and a ground line (G line) at an input side of a single-phase three-line and each of a phase voltage line (R line), a neutral line (N line), and a ground line (G line) at an output side thereof, thereby more efficiently preventing an electric shock accident.

MODES OF THE INVENTION

Figure 1:
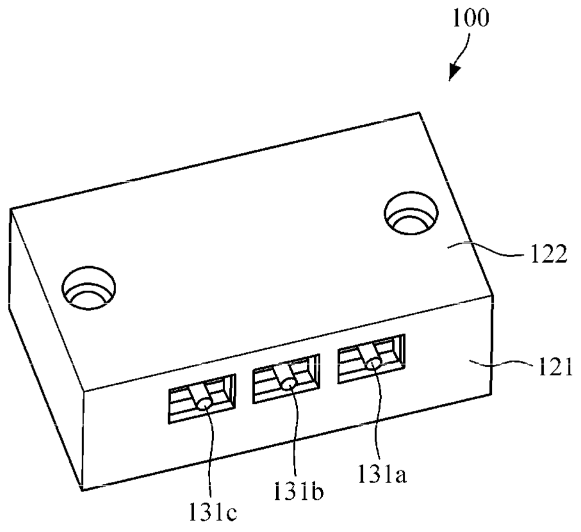
FIG. 1 is an external perspective view illustrating a configuration of a terminal block having a leakage current restricting function according to one embodiment of the present invention.

Hereinafter, exemplary embodiments of the present invention will be described below in more detail with reference to the accompanying drawings such that a skilled person in this art can easily understand and implement the present invention. Although specific embodiments are illustrated in the drawings and detailed descriptions are described, the embodiments are not intended to limit embodiments of the present invention to any particular form.

In the description of the present invention, when it is determined that detailed descriptions of related well-known functions or configurations unnecessarily obscure the gist of the present invention, the detailed descriptions thereof will be omitted.

In the case that one component is described as being "connected" or "linked" to another component, it should be understood that the component may be directly connected or linked to the corresponding component or other components may be present therebetween.

On the other hand, in the case that one component is described as being "directly connected" or "directly linked" to another component, it should be understood that other components are not present therebetween.

Figure 2:
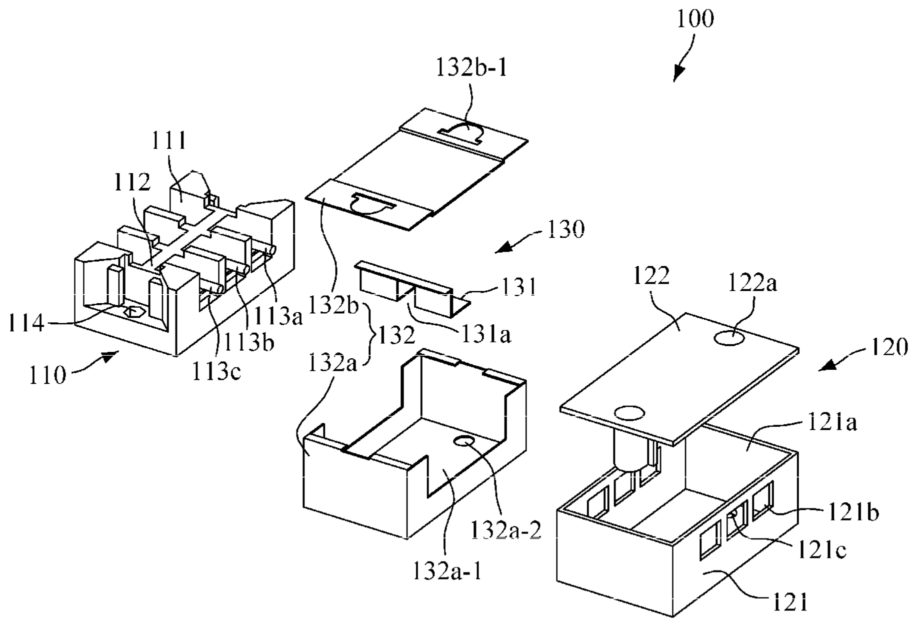
FIG. 2 is an exploded perspective view illustrating the configuration of the terminal block having a leakage current restricting function according to one embodiment of the present invention.

FIG. 1 is an external perspective view illustrating a configuration of a terminal block having a leakage current restricting function according to one embodiment of the present invention, and FIG. 2 is an exploded perspective view illustrating the configuration of the terminal block having a leakage current restricting function according to one embodiment of the present invention.

As shown in the drawings, a terminal block 100 having a leakage current restricting function according to the present embodiment includes an insulator terminal block body 110, an insulator outer case 120, and a leakage current restricting unit 130.

The insulator terminal block body 110 is made of an insulating material, a plurality of electrode accommodation grooves 111 formed by cutting from an upper portion to a lower portion thereof are formed to be opposite to each other at an input side and an output side, and each of the electrode accommodation grooves 111 is electrically isolated by a partition wall 112.

Meanwhile, an R conductor electrode 113*a*, of which both ends are connected to a phase voltage line (R line) (not shown) at an input side of a single-phase three-line and a phase voltage line (R line) (not shown) at an output side of the single-phase three-line, is mounted inside the insulator terminal block body 110. For example, the R conductor electrode 113*a* may be installed to pass through the partition wall 112 between two electrode accommodation grooves 111 formed at one peripheral side of the insulator terminal block body 110.

In addition, an N conductor electrode 113*b*, of which both ends are connected to a neutral line (N line) (not shown) at the input side of the single-phase three-line and a neutral line (N line) (not shown) at the output side of the single-phase three-line, is mounted inside the insulator terminal block body 110. For example, the N conductor electrode 113*b* may be installed to pass through the partition wall 112 between two central electrode accommodation grooves 111 formed in the insulator terminal block body 110.

In addition, a G conductor electrode 113*c*, of which both ends are connected to a ground line (G line) (not shown) at the input side of the single-phase three-line and a ground line (G line) (not shown) at the output side of the single-phase three-line, is mounted inside the insulator terminal block body 110. For example, the G conductor electrode 113*c* may be installed to pass through the partition wall 112 between two electrode accommodation grooves 111 formed at the other peripheral side of the insulator terminal block body 110.

The insulator outer case 120 is coupled to the insulator terminal block body 110 to surround upper and lower portions thereof. For example, the insulator outer case 120 includes an insulator outer case base body 121 having an accommodation groove 121*a* in which the insulator terminal block body 110 is accommodated, and an insulator outer case cover 122 coupled to an upper portion of the insulator outer case base body 121 through screws (not shown) in a state in which the insulator terminal block body 110 is accommodated in the accommodation groove 121*a*.

In the drawing, a reference numeral 121 denotes through grooves through which the phase voltage line (R line) at the input side and the phase voltage line (R-line) at the output side, the neutral line (N-line) at the input side and the neutral line (N-line) at the output side, and the ground line (G-line) at the input side and the ground line (G-line) at the output side of the single-phase three-line pass, reference numerals 121*c* and 122*a* denote screw coupling grooves to which screws are coupled, and reference numeral 114 denotes a screw through groove through which a screw passes.

The leakage current restricting unit 130 is in electrical contact with the N conductor electrode 113*b* of the insulator terminal block body 110 to expand an area of the N conductor electrode 113*b*, thereby restricting a leakage current.

For example, the leakage current restricting unit 130 may include a conductor area expansion piece 131 which is in electrical contact with the N conductor electrode 113*b* to expand the area of the N conductor electrode. In this case, a cutout 131*a* may be formed in a middle portion of the conductor area expansion piece 131.

Through the cutout 131*a*, the conductor area expansion piece 131 is inserted into and coupled to the partition wall 112 between the two central electrode accommodation grooves 111 formed in the insulator terminal block body 110, and thus a lower portion of the conductor area expansion piece 131 is in electrical contact with the N conductor electrode 113*b* at both sides of the conductor area expansion piece 131 installed to pass over the partition wall 112 between the two central electrode accommodation grooves 111.

In the present invention, through such implementation, due to the conductor area expansion piece 131, the R conductor electrode 113*a* and the N conductor electrode 113*b* have different conductor areas, and a leakage current is restricted due to an area difference between the R conductor electrode 113*a* and the N conductor electrode 113*b* having different conductor areas.

In this case, as a difference in conductor area between the R conductor electrode 113*a* and the N conductor electrode 113*b* increases, a leakage current gradually decreases. Since a risk of electric shock decreases as a leakage current decreases, a leakage current restricting function can be provided without a risk of electric shock.

This is because, as disclosed in Korean Patent Registration No. 10-1625493 (May 24, 2016) described in the related art, as compared with a plate-shaped conductor connected to a positive terminal of a power supply (corresponding to the R conductor electrode of the present invention), in a plate-shaped conductor connected to a negative terminal (corresponding to the N conductor electrode of the present invention), as an area thereof increases, a leakage current decreases.

Therefore, in the present invention, a leakage current is restricted using an area difference between the conductor electrodes of which both ends are connected to the phase voltage line (R line), the neutral line (N line), and the ground line (G line) at the input side of the single-phase three-line and each of the phase voltage line (R line), the neutral line (N line), and the ground line (G line) at the output side thereof, thereby more efficiently preventing an electric shock accident.

Meanwhile, according to an additional aspect of the present invention, the leakage current restricting unit 130 may further include a conductor inner case 132. The conductor inner case 132 is in electrical contact with the conductor area expansion piece 131 to additionally expand the area of the N conductor electrode 113*b*.

For example, the conductor inner case 132 includes an conductor inner case base body 132*a* having an accommodation groove 132*a*-1 in which the insulator terminal block body 110 is accommodated, and a conductor inner case cover 132*b* coupled to an upper portion of the conductor inner case base body 132*a* through screws (not shown) in a state in which the insulator terminal block body 110 is accommodated in the accommodation groove 132*a*-1.

The lower portion of the conductor area expansion piece 131 is in electrical contact with the N conductor electrode 113*b*, and an upper portion of the conductor area expansion piece 131 is in electrical contact with a lower surface of the conductor inner case cover 132*b* to additionally expand the area of the N conductor electrode 113*b*.

In addition, the conductor inner case cover 132*b* is coupled to the upper portion of the conductor inner case base body 132*a* to further expand the area of the N conductor electrode 113*b*. In the drawing, reference numerals 132*a*-2 and 132*b*-1 denote screw through grooves through which screws for coupling the insulator outer case base body 121 and the insulator outer case cover 122 pass.

In the present invention, through such implementation, a leakage current is restricted using an area difference between the conductor electrodes which both ends are connected to each of the phase voltage line (R line), the neutral line (N line), and the ground line (G line) at the input side of the single-phase three-line and each of the phase voltage line (R line), the neutral line (N line), and the ground line (G line) at the output side thereof, thereby more efficiently preventing an electric shock accident.

The various embodiments disclosed in the present specification and drawings are merely illustrative of specific examples for better understanding of the present invention and are not intended to limit the scope of various embodiments of the present invention.

Therefore, the scope of various embodiments of the present invention is to be interpreted to include all changes and modifications derived from the technical idea of various embodiments of the present invention in addition to the embodiments described herein.

INDUSTRIAL APPLICABILITY

The present invention can be used industrially in a terminal block-related technical field and an application technical field thereof.

The invention claimed is:

1. A terminal block having a leakage current restricting function, comprising:

an insulator terminal block body including an R conductor electrode, an N conductor electrode, and a G conductor electrode which are mounted therein, wherein a phase voltage line (R line) at an input side of a single-phase three-line and a phase voltage line (R line) at an output side of the single-phase three-line are connected to both end portions of the R conductor electrode, a neutral line (N line) at the input side of the single-phase three-line and a neutral line (N line) at the output side of the single-phase three-line are connected to both end portions of the N conductor electrode, and a ground line (G line) at the input side of the single-phase three-line and a ground line (G line) at the output side of the single-phase three-line are connected to both end portions of the G conductor electrode;

an insulator outer case coupled to the insulator terminal block body to surround an upper portion and a lower portion thereof; and a leakage current restricting unit which is in electrical contact with the N conductor electrode of the insulator terminal block body and expands an area of the N conductor electrode to restrict a leakage current, wherein the leakage current restricting unit includes:

a conductor area expansion piece which is in electrical contact with the N conductor electrode and expands the area of the N conductor electrode; and a conductor inner case which is in electrical contact with the conductor area expansion piece and additionally expands the area of the N conductor electrode, wherein the conductor inner case includes a conductor inner case base body having an accommodation groove in which the insulator terminal block body is accommodated and a conductor inner case cover coupled to an upper portion of the conductor inner case base body in a state in which the insulator terminal block body is accommodated in the accommodation groove, wherein a lower portion of the conductor area expansion piece is in electrical contact with the N conductor electrode and an upper portion of the conductor area expansion piece is in electrical contact with a bottom surface of the conductor inner case cover to additionally expand the area of the N conductor electrode, and the conductor inner case cover is coupled to the upper portion of the conductor inner case base body to further expand the area of the N conductor electrode.

* * * * *